Patented Jan. 6, 1931

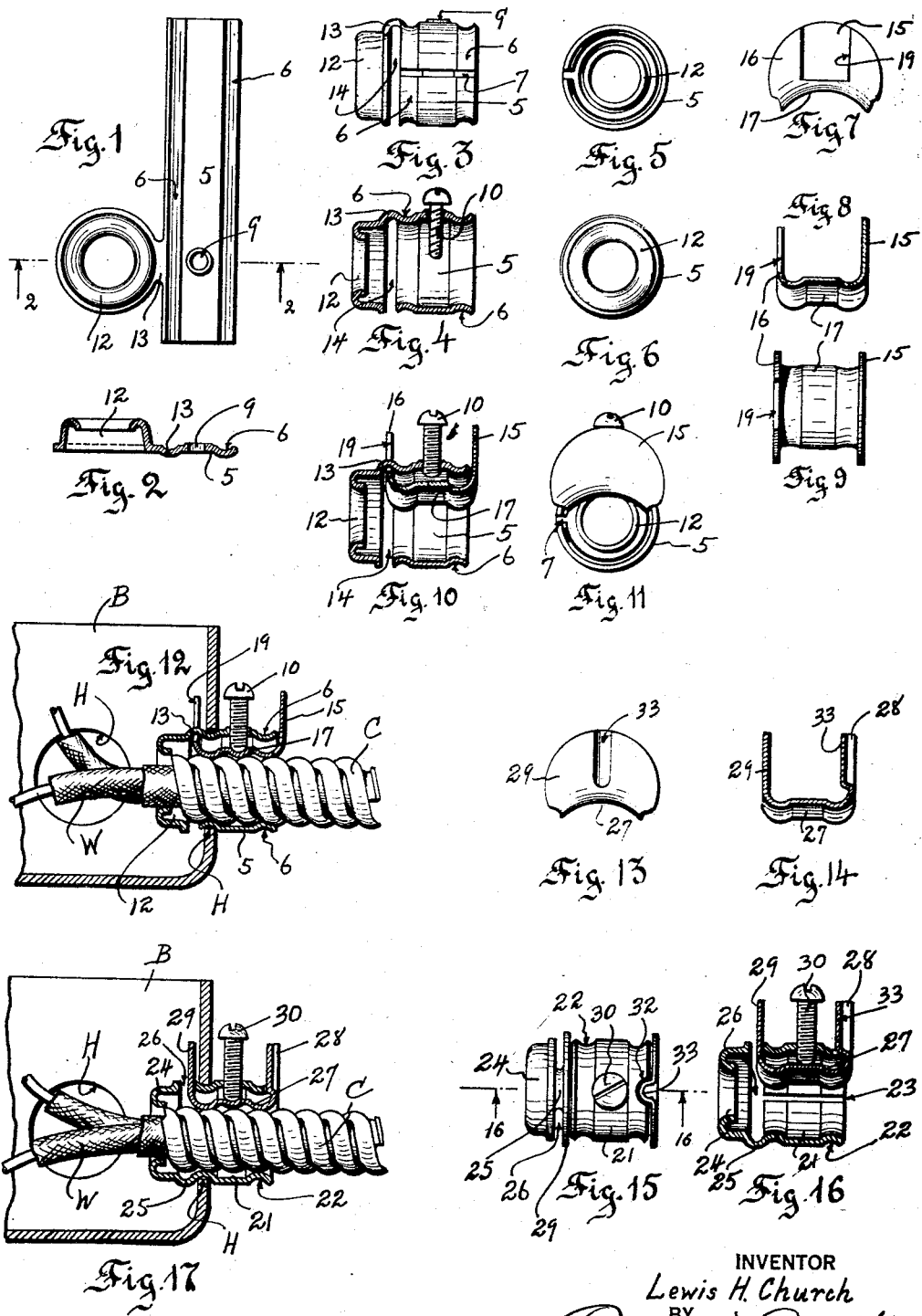

1,787,667

UNITED STATES PATENT OFFICE

LEWIS H. CHURCH, OF ELIZABETH, NEW JERSEY, ASSIGNOR TO THE THOMAS & BETTS CO., OF ELIZABETH, NEW JERSEY, A CORPORATION OF NEW JERSEY

CABLE CONNECTER

Application filed November 12, 1926. Serial No. 148,070.

This invention relates to cable connecters and particularly to bushings therefor, and relates to adapter connecters capable of universally anchoring all sizes and shapes, flat or round, large or small, armored or soft, cable to electric fixture boxes.

An outstanding object of the invention is to provide, on an adapter connecter capable of such universality of use as above stated, a bushing which acts as a stop against which comes to rest the ragged sharp jagged end of the armored cable, as well as to guide and protect the insulation covered wires from the sharp metal armored cable end. It is the object to improve bushings on and for connecters to the end that a full-fashioned solid ring circular bushing, unmutilated in its structure, may be carried with an adapting connecter, particularly when the connecter itself may be a split-type sleeve connecter or otherwise constructed to render it elastic to facilitate its anchorage in box.

Also it is an object to provide on a cable connecter, a wire guide bushing which functions entirely independently of the connecter appurtenances such as operating or pressure producing means, the box hole edge anchorage means, the adapter, or other elements which may be movably carried with the connecter.

A further object is to produce a cable connecter of improved sleeve type wherein the sleeve is partly split longitudinally and partly split transversely so that one end of the sleeve is elastic to facilitate entry into a box hole and the other end is an unbroken ring portion from which a full-fashioned solid ring bushing is fashioned.

A further object of the invention is to produce a cable connecter including an adapter together with improved guide means whereby the adapter is guided in movement on the connecter member or in a connecter sleeve and retained in working relation or alignment with the operating or pressure producing means.

With the above and other objects in view, the invention has relation to the several examples of construction and modes of assembly and operation as presented in the accompanying drawing which shows one embodiment of the invention, and it is understood that the connecter may be varied in construction, operation and use without departing from the principles of this invention.

Figure 1 shows a sheet metal stamping including an integral bushing; and Figure 2 illustrates a section on the line 2—2.

Figure 3 shows a finished connecter member as a sleeve rolled from the flat stamping; and Figure 4 illustrates a longitudinal section thereof complete with operating means as a screw.

Figure 5 shows the outer end of the sleeve; and Figure 6 shows the inner end, i. e. the bushing end.

Figures 7, 8 and 9 show views of an adapter element for use on the connecter, which adapter includes a cable bearing clamp plate and sleeve closing shutters, Figure 7 being the end of the adapter which carries a slotted shutter, Figure 8 a longitudinal section, and Figure 9 a plan view of the adapter.

Figure 10 is a longitudinal section of the assembled connecter member, with its appurtenances, i. e. the operating means, and the adapter; and Figure 11 shows the outer end thereof.

Figure 12 shows an electric fixture box together with a connecter and cable assembly, illustrating how the adapter connecter with its bushing anchors a cable in a box.

The next five views illustrate a modified form of the connecter including a box assembly showing the application of the modified connecter; and the variation in construction appertains to specially designed adapter guide means.

Figures 13 and 14 show respectively, the outer end of the modified adapter and a longitudinal section.

Figures 15 and 16 show respectively, a plan view and a section on line 16—16 of the connecter, the sleeve of which may be substantially the same in structure as in the former views, but the adapter is changed somewhat.

Figure 17 is a box assembly view of the modified connecter.

Referring further to the drawing for a description of an embodiment of the invention, and describing first that form of the connecter shown in Figures 1 to 12, reference is first made to the general box view Figure 12 for an understanding of the uses of a connecter.

An outstanding feature of this invention is the ability of the connecter to adapt itself to small or large, flat or round, armored or unarmored cable, and to anchor the cable in a standard size hole H of boxes B and then close the hole against entry of plaster and dirt incident to building construction. Electric fixture boxes B receive cable C into the box hole or knock-out H, and the wires W are manipulated within the boxes B to establish electric connections in the usual way. A connecter member 5 with its appurtenances is anchored in the box hole H by any suitable means and also secures the cable to the box. The inner end of the cable C, especially if armored cable is used, is usually jagged, sharp or burred, where the spiral cable armor is broken off, and this improved bushing protects the insulation on the wires W from being cut or abraded by reason of the sharp, jagged cable ends C; and the bushing also acts as a stop against which rests the cable.

A cable connecter necessarily embodies a member of suitable form on which is movably carried the connecter appurtenances such as the operating means, and the adapter. To this end, a sleeve is shown as an example of a connecter member or base member, acting as a foundation upon which to mount the movable connecter appurtenances. While a sleeve is shown, other forms of a connecter base member can be utilized, and the improved bushing combination adapts itself to any type of connecter member and performs its function independently of the movable connecter appurtenances.

A sleeve 5 is to a large extent a preferred type connecter member and it may be rolled from the Figure 1 stamping. The sleeve stamping 5 is blanked from sheet metal with a groove 6 formed therein. Preferably two parallel grooves 6 extend along the edge of the stamping and thus the sleeve carries a circumferential box hole anchorage groove at each end to secure the connecter in the box hole H. The sleeve includes a longitudinal split 7 by which it is rendered inherently elastic so it may contract to enter a box hole and expand to cause one or the other of its grooves to anchor itself against the box hole edge.

Operating means are carried with the connecter and are preferably mounted on the connecter member. To this end a threaded screw hole 9 is formed in the sleeve and a screw 10 is mounted in the sleeve and threads through the hole 9 to deliver pressure to an adapter element and to a cable received into the sleeve 5 and box hole H. Furthermore, the screw operating or cable clamp means render effective the box hole edge anchorage means by expanding a sleeve groove 6, one or the other, in the box hole. It is important to observe that the screw 10 may be mounted inside or outside the box B dependent upon which sleeve groove 6 is snapped into the box hole H.

A bushing 12 is carried with the connecter, and preferably with the member 5. The bushing is a continuous or solid full-fashioned ring unsplit and unmutilated, and is integrally attached to the connecter member 5 by a neck 13. The neck may be formed in longitudinal alignment with the screw operating means 9—10. The bushing neck 13 is bent at right angles to the plane of the Figure 1 stamping, so that the bushing axis and sleeve axis are coincident if desired. The neck 13 mounts the bushing 12 in spaced relation from the inner end of the sleeve and thus is formed a transverse or circumferential slot 14 between the sleeve and bushing.

Figure 3 shows the finished sleeve and bushing fashioned from a single sheet of metal, while Figure 4 shows a complete connecter by reason of carrying the screw 10. In this first form of the invention being described the screw 10 and neck 13 may to advantage be in line or on the same side of the sleeve to better utilize the guide means to be described and by which the neck guides an adapter in movable alignment with the screw. The connecter in Figure 4 may be used for certain types of work, say with armored cable. The screw 10 delivers pressure to the armored cable to fix the cable in a box hole H and in the connecter 5 as well, and expands an anchorage groove 6 in the box hole H to anchor both the connecter and the cable in the box B. The solid ring full-fashion type bushing 12 on a split distensible sleeve 5 protects the wires W and at the same time does not interfere with the action of the sleeve since the bushing is spaced from the sleeve and is independent of any and all sleeve operating means.

The above described sleeve with its bushing is one suitable form of connecter member which may be used with an improved connecter adapter to produce a cable connecter of such universal application as early stated and by which cable of so many varieties can be attached to a box by one and the same connecter, thus rendering unnecessary the manufacture of a special connecter for each and every job and cable size with which one is confronted in building construction.

Referring to Figures 7, 8 and 9 for an understanding of the adapter element, there is shown a U-shaped adapter fashioned from a single sheet metal stamping. In side elevation, the adapter is substantially U-shaped and may include one or two parallel shutter plates 15 and 16 integrally carried on a cable bearing clamp plate 17. The shutters 15 and 16 are preferably circular and may be larger in diameter than that of the sleeve 5 since the shutters are designed to close that portion of the sleeve passage and the box hole H not occupied by the cable C.

Whether one or the other sleeve and box anchoring groove 6 is engaged in a box hole H, one shutter will in reality close the sleeve or box hole. However that may be, a more symmetrical construction is provided by making two shutters 15 and 16 of uniform size and thus both ends of the sleeve are closed. One of the sleeve shutters, as 16, is provided with an opening, say a slot 19, to cooperate with the neck 13 of the connecter member 5 and by which the adapter 16—17 is movably retained and guided in working relation with the screw operating cable clamp means 10.

The adapter 16—17 is movably carried on the connecter or mounted within the sleeve 5 with the cable clamp plate 17 parallel to the sleeve axis and adapted to move laterally or radially therein and be worked or actuated by the screw 10. The shutter 16 slides up and down in slot 14 with its slot 19 embracing the neck 13. In this way the clamp plate 17 is retained in line with the end of the screw 10 since the neck 13 acts as a stationary guide to direct the movement of the adapter laterally back and forth in the sleeve 5. The other shutter 15 slides freely at that end of the sleeve which is opposite the bushing 12. The operating means 10 forces the clamp plate 17 against the cable C and holds the shutters in closed position, the shutters moving down into closed position as the screw 10 is turned to effect permanent anchorage of all parts.

The foregoing arrangement provides a connecter member 5 with its ends disposed movably between the upstanding parallel shutter plates 15 and 16 of an adapter and with a clamp plate 17 disposed inside the sleeve and the shutters on the outside of the sleeve together with a bushing which projects beyond the sleeve end overhanging the adjacent shutter plate entirely independent of the adapter and operating means. In other words, the bushing is carried beyond the end of the sleeve connecter where it is out of the way of all movable parts and thus is not required to be split because it does not enter into the operation of the cable connecter.

Coming now to a description of the modified form of the connecter, wherein the bushing neck above described is not here used as a guide for the adapter, reference is made to the Figures 13 through 17.

The connecter shown in Figures 15 and 16 is similar to the connecter already described, but the construction of the shutter and adapter guide means is varied somewhat to the end that the adapter may be mounted on the connecter member in opposition to the neck 25 which means that the shutter 29 running in the transverse slot 26 need not be mutilated or slotted.

A sleeve 21 is quite similar in structure to the sleeve 5 heretofore described in that it is provided with one or more box hole edge engaging means such as anchorage grooves 22 together with a longitudinal split 23 by which the sleeve is rendered inherently elastic that it may be contracted and snapped into a box hole H and expand therein. Furthermore, a bushing 24 is carried by a neck 25 at one end of the sleeve 21, and the bushing 24 is spaced from the connecter member 21 by a transverse slot 26.

An adapter comprises a cable bearing clamp plate 27 with integral upstanding parallel shutter plates 28 and 29, and a modified form of guide means therefor is shown. The adapter 27—29 is slidably confined over the ends of the sleeve 21. Thus one shutter 29 is slidable up and down in the slot 26 between the bushing 24 and connecter member 21 while the other shutter 28 slidably engages the outer sleeve end. A screw 30 is threaded through the sleeve 21 and stands in line with and perpendicular to the clamp plate 27 and parallel and between the shutter plates 28 and 29.

The bushing neck 25 is disposed oppositely to the shutter 29 and oppositely to the screw 30. Furthermore, the shutter 29 is a full circular shutter plate without being slotted so that the adapter in this form of the invention is uniform in construction at its ends and both shutters act to close the sleeve and box hole. Guide means to retain the sleeve 21 and adapter 27—29 in working relation and alignment are availed of by forming a cooperating guide rib and groove between the outer sleeve end and one of the shutter plates. For this purpose a groove 32 is cut in the sleeve end in axial alignment with the screw 30, and a lengthwise rib 33 is pressed into the shutter plate 28. The cooperating shutter rib 33 and sleeve groove 32 fit together and permit free up and down motion of the adapter 27—29 in the sleeve 21 or conversely permit the sleeve to slide up and down in a U-shaped adapter, but the adapter and sleeve parts are restrained against relative rotation one on the other by the cooperating guide rib and groove means 32 and 33.

Figure 17 shows the modified form of connecter just described mounted in a box B, and the manner of use and mode of operation is largely the same as the first connecter described. However, it is observed that the bushing neck 25 is usually disposed towards the lowermost part of the box. The screw 30 is run down against the clamp plate 27 to deliver pressure to and clamp the cable C in the box hole and sleeve and to simultaneously expand the connecter sleeve in the box hole H. Furthermore, the screw 30 actuates or works and holds the shutter or shutters in closed position to seal that portion of the cable sleeve not occupied by the cable. Ofttimes the cable C is rather small and thus the shutters 28 or 29 are called upon to close off a substantially large passage through the sleeve.

In all forms of the invention, it is significant that the bushing 12 or 24 is rigidly held at one end of the sleeve and performs its office as a stop for the extremity of the cable C and is a guide for the wires W entirely independently of the connecter member and its movable appurtenances.

What I claim is:—

1. A connecter comprising a member including box hole edge anchorage means, a cable clamp plate mounted on the member, attaching means included on the ends of the clamp plate and slidable with respect to the member to retain it on the member, operating means carried with the connecter to deliver pressure on the clamp plate, and a bushing carried at the connecter end adjacent the attaching means.

2. A connecter comprising, a member including box hole edge anchorage means, a cable clamp plate mounted on the member, a shutter carried with the clamp plate to close a box hole, means to guide and retain the clamp plate and shutter on the member, operating means carried with the connecter to deliver pressure on the clamp plate, and a bushing carried at the connecter end.

3. A connecter comprising, a member including box hole edge anchorage means, operating means carried with the connecter to clamp against a cable, a full-fashioned circular bushing carried on the connecter end, said connecter provided with an open space between the member and bushing, and shutter means carried with the connecter and movably mounted in the open space between the bushing and member.

4. A connecter comprising, a member including box hole edge anchorage means, a screw threaded through the member to clamp against a cable and render effective the box hole anchorage means, a full-fashioned circular bushing and means carrying it in spaced relation from an end of the member, and a shutter movably disposed between the bushing and member and actuated by the screw.

5. A connecter comprising, a member including box hole edge anchorage means, operating means carried with the connecter to clamp against a cable and render effective the box hole anchorage means of the member, a full-fashioned circular bushing, a neck integrally joining the bushing on one end of the member with a slot between the member and bushing, and shutter means movably disposed in the slot and actuated by the operating means.

6. A cable connecter comprising, a U-shaped adapter including a cable clamp plate and shutter means, a member movably mounted on the adapter and including box hole anchorage means, a bushing carried on the end of the member beyond the adapter, and operating means carried with the connecter to deliver pressure to the adapter and render effective the box hole anchorage means.

7. A cable connecter comprising, a U-shaped adapter including a cable clamp plate with a shutter on each end thereof, a member movable mounted between the shutters and means to anchor the member in a box hole, a bushing and means carrying it on the connecter beyond the adapter, and operating means carried with the connecter to deliver pressure to the adapter and work the means which anchors the connecter in a box hole.

8. A connecter comprising, a sleeve and box hole anchorage means and also including a circumferential slot near one end, a shutter slidably mounted in the slot, a bushing fashioned on the sleeve end adjacent the slot, and operating means to hold the shutter closed and work the anchorage means.

9. A connecter comprising, a sleeve and box hole anchorage means and also including a circumferential slot near one end, a shutter slidably mounted in the slot, a clamp plate integral with and at right angles to the shutter in the sleeve and extending away from the slot, and operating means to hold the shutter closed and work the anchorage means.

10. A cable connecter comprising, a longitudinally split sleeve having a box hole edge anchorage groove and a transverse slot adjacent the groove, a shutter slidably disposed in the slot, operating means mounted on the sleeve to hold the shutter closed and expand the sleeve groove in a box hole, and a full-fashioned circular bushing formed of the sleeve end adjacent the slot and adjacent the shutter.

11. A connecter comprising, a split sleeve with a box hole edge anchorage groove and bushing, said sleeve having a transverse slot between the bushing and groove, operating means carried with the connecter to expand the groove, and a shutter slidably disposed in the slot and held closed by the operating means.

12. A connecter comprising; a sleeve split lengthwise, and having a box hole edge engaging groove at each end, a bushing carried at one end, and a transverse slot between the bushing and the adjacent groove; sleeve closing means slidable in the slot, and operating means carried with the connecter to expand the split sleeve and actuate the closing means.

13. A connecter comprising; a split sleeve, a bushing at one end, and a box hole anchorage groove at the other end; a shutter, and means mounting it for movement transversely of the sleeve axis; and operating means to hold the shutter closed and expand the sleeve.

14. A connecter comprising; a sleeve split lengthwise from one end to a point proximate the other end, including a circumferentially extending slot cutting through the lengthwise split at the proximate point, a full-fashioned circular bushing made on the end of the sleeve beyond the lengthwise split adjacent the slot, and a box hole edge anchorage groove at each end of the lengthwise split portion; operating means mounted on the lengthwise split sleeve portion; and an adapter, including parallel circular sleeve closing plates, one of which slides in the slot and the other at the end of the sleeve, and a clamp plate inside the sleeve joining the sleeve closing plates and actuated by the operating means.

15. A connecter comprising, a sleeve including box hole anchorage means, a bushing spaced from the sleeve end, a neck joining the bushing to the sleeve; an adapter, including a shutter mounted for transverse movement in the connecter between the bushing and the sleeve, and a clamp plate; clamp plate operating means, and means cooperating with the neck and shutter to guide the clamp plate in working alignment with the operating means.

16. A connecter comprising, a sleeve, a bushing carried at one end, a neck connecting the sleeve and bushing in spaced relation, a shutter slidably mounted between the sleeve end and bushing, a clamp plate integral with the shutter and mounted in the sleeve for lateral movement, means between the bushing and sleeve end cooperating with the shutter by which the clamp plate is guided in its lateral movement, operating means to actuate the clamp plate, and box hole edge anchorage means carried with the connecter.

17. A connecter comprising; a member, including box hole anchorage means; a neck integral with the member at one end thereof, and a bushing integral with the neck; an adapter, including a cable clamp disposed parallel to the member, a box hole shutter at right angles to the clamp which shutter is disposed between the bushing and member, said shutter having a slot which embraces the neck and guides the adapter in movable relation to the member; and operating means to work the adapter.

18. A connecter comprising; a sleeve member formed from a single elongated strip of sheet material including box hole edge engaging means; operating means carried with the connecter, to clamp a cable and simultaneously anchor the engaging means in a box hole; a neck integral with the member in substantial longitudinal alignment with the operating means, a full-fashioned solid ring bushing integral with the neck and mounted at the end of member independently of the operating means.

19. A connecter comprising; a sleeve formed from a single elongated strip of sheet material including box hole edge engaging means; a screw threaded through the sleeve to clamp against a cable and seat the engaging means against a box hole edge; and a bushing mounted at the end of the sleeve, and integrally joined with the sleeve by means of a neck longitudinally in line with the screw.

20. A connecter comprising, a sleeve rolled from a single rectangular sheet metal stamping, including box hole edge anchorage means, a bushing fashioned from a ring attached to an edge of the stamping and bent at right angles to the plane of the stamping to fold the bushing into line with the sleeve, and operating means mounted on the connecter to clamp against a cable.

In testimony whereof I affix my signature.

LEWIS H. CHURCH.